SINGLE-WIRE CONTROL, SUPERVISION AND FAULT DETECTING CIRCUIT ARRANGEMENT IN COMPUTER CONTROLLED AUTOMATIC TELEPHONE EXCHANGES
Filed June 15, 1966
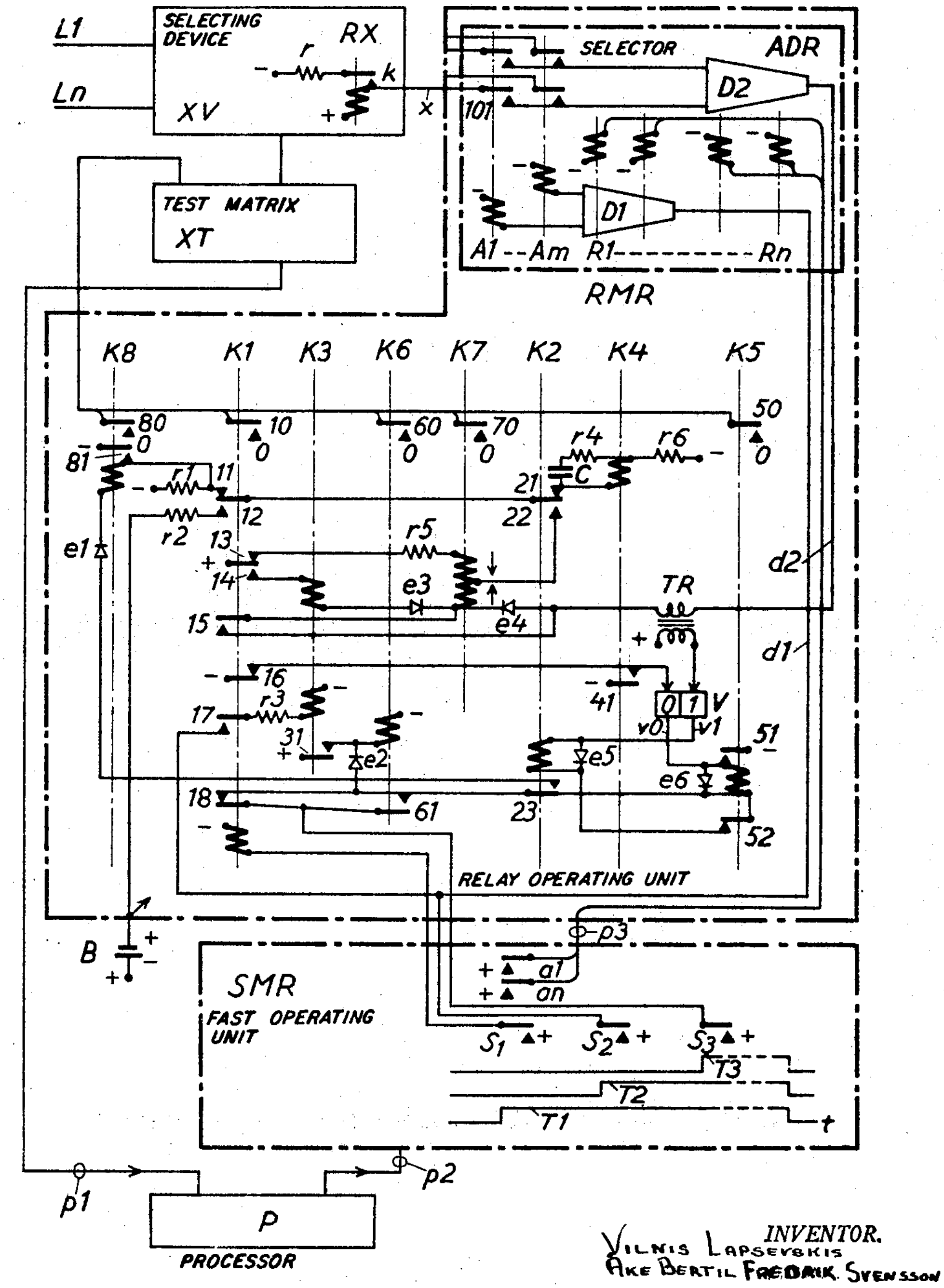
INVENTOR.
Vilnis Lapsevskis
Ake Bertil Fredrik Svensson
BY Hane and Nydick
Attorneys United States Patent Office 3,509,284
Patented Apr. 28, 1970

3,509,284
SINGLE-WIRE CONTROL, SUPERVISION AND FAULT DETECTING CIRCUIT ARRANGEMENT IN COMPUTER CONTROLLED AUTOMATIC TELEPHONE EXCHANGES

Vilnis Lapsevskis and Åke B. F. Svensson, Hagersten, Sweden, assignors to Telefonaktiebolaget L M Ericsson, Stockholm, Sweden, a corporation of Sweden Filed June 15, 1966, Ser. No. 557,824
Claims priority, application Sweden, July 15, 1965, 9,381/65
Int. Cl. H04m 3/08
U.S. Cl. 179—18 2 Claims

ABSTRACT OF THE DISCLOSURE

A processor controlled automatic telephone exchange includes a plurality of incoming and outgoing call lines connected to a line selecting means which is controlled by electromagnetic devices. A buffer storage unit acts as the processor's interface to transfer signals from the lines to the processor and to store signals received from the processor. The address selector of an electromagnetic device operating unit controls the connection of the electromagnetic devices in the selecting means in order to perform and supervise the operation of the devices by means of a single wire for each device. Within the buffer storage unit is a first pulse contact means signalling the operation of an electromagnetic device and other contact means for connecting an operating signal to the signal wire of the device. The primary winding of a transformer is included in the circuit of the operating signal at least when the device is released. An electronic bistable circuit is connected to the secondary winding and is switched by the decrease of current in the signal wire caused by the inductance of the transformer when the electromagnetic device is de-energized.

The present invention refers to computer controlled automatic telephone exchanges containing a selecting device to which a number of lines for incoming and outgoing calls are connected, and furthermore to a computer for the connection, disconnection and control of the telephone communications between said lines. Between the selecting device and the computer are test-matrices for input signals from the selecting device and the lines to the computer as well as at least one buffer storage or fast operating unit that receives and records output signals from the computer and forwards the output signals though relay opeating units to the lines and to the selecting device of the telephone exchange.

The transmission of the output signals from a fast operating unit to relays or the like in a line equipment or selecting devices of the conventional type in automatic telephone exchanges, requires automatic control and supervision and recording and alarm indications for all kinds of faults that may appear. A prior art system is described in The Bell System Technical Journal, vol. 43, September 1964, Part 1, pages 1836–1838.

A general object of the invention is to provide improvements in such a system.

Another object of the invention is to carry out supervision, etc., of the electromagnetic means only via one control conductor or signal wire for each such means. Operation as well as release of the electromagnetic means is to be effected by current impulses through the single signal wire.

In such systems the control of the interruptions and short-circuits to ground or between signal wires is needed. Difficulties often arise especialy during the control of the release of an electromagnetic means, such as used in crossbar switches, relay switches and electromechanical relays.

A further requirement is to be able to read the conditions of the electromagnetic means without changing their states for it may at times be necessary to correct the data memory of the computer so that it corresponds to the actual conditions of the electronic means.

Briefly, the invention contemplates an automatic telephone exchange under the control of a processor. In the exchange there is a selecting means controlled by electromagnetic devices for selecting incoming and outgoing call lines. Connected to the processor is a buffer storage unit which receives and registers signals from the processor, while the processor receives signals from the call lines. Connected to the buffer storage unit is an electromagnetic device operating unit to control and supervise the electromagnetic devices in the selecting means via a single signal wire per device. Within the buffer storage unit is a first pulse contact means for signalling the operation of a selected electromagnetic device and other pulse contact means for transmitting operating signals to the signal wire of the selected electromagnetic device. The primary of a transformer is included in the circuit of the operating signal at least when the electromagnetic device is released. An electronic bistable circuit is connected to the secondary of the transformer so that the bistable circuit is switched by the decrease in current in the signal wire caused by the inductance of the transformer when the electromagnetic device is released.

The invention will be described in greater detail herebelow by making reference to the single figure of the accompanying drawing. In the figure, L1 and L*n* are telephone lines which are connected to a switching network or seletcing device XV built of telephone relays and electromagnetically operated selectors (electromagnetic devices). A precessor or computer P receives input signals from the lines L1–L*n* and from the selecting device XV through a scanner or test-matrix XT. In the computer P the input signals are transformed according to the programming of the computer into output signals which are received and recorded temporarily in a fast operating unit SMR of a distributor.

From unit SMR, address signals and operating signals are supplied to an electromagnetic or relay operating unit RMR of the distributor. The address signals set a selector ADR which connects that electromagnetic device or relay RX in the selecting device XV which is to be operated. The selector ADR consists of connecting relays A1–A*m* and selection relays R1–R*n* which set contact pyramids D1–D2. In the relay operating unit RMR, there are furthermore relays K1–K8, a transformer TR, an electronic bistable circuit V and rectifiers *e*1–*e*6, resistances *r*1–*r*6 and a capacitor C. The bistable circuit V is normally in the 0-condition, the output *v*1 having negative potential. When the bistable circuit V is switched to the 1-position the negative potential is switched from the output *v*1 to the output *v*o.

The fast operating unit SMR consists of electronic bistable circuits which are set in different combinations from the computer P through a cable of wires *p*2 which set electronic contacts *a*1–*an*, S1–S3. The contacts *a*1–*an* indicate the address to the relay RX that is to be operated. The contact S1 is closed only when relay RX is released while the contacts S2 and S3 are closed on operation as well as on release. Signals are transmitted from unit SMR to unit RMR by means of pulses T1–T3 occurring along the time base *t*. The pulses T1–T3 begin at different points of time but are terminated simultaneously after each operation.

At the beginning of a pulse T1 those contacts *a*1–*an* which indicate the address are closed and corresponding relays R1–R*n* in selector ADR operate. If it is supposed that a relay RX is to be operated, the contact S1 will not be closed and therefore the relay R1 is not operated. When the pulse T2 begins and the contact S2 is closed, one of the relays A1–A*m* in selector ADR, for example the relay A1, will be operated. The contact 101 and other contacts are closed. At the beginning of the pulse from contact S3 the following circuit will be completed: source +, contact S3, contacts 18 and 52, the winding of the relay K2, the wire *v*1, to a negative voltage in the bistable circuit V. The relay K2 operates. The contacts 21–23 are actuated. The following circuits are completed:

(a) Source +, contact S3, contacts 18 and 23, rectifier *e*1, the winding of relay K8, the resistance *r*1 to a negative voltage.

(b) Source +, the contact 13, the resistance *r*5, the upper winding of the relay K7, the contacts 22 and 11, the resistance *r*1, to a negative voltage.

(c) Source +, the winding of the relay RX, the wire *x*, the contact 101, contacts in D2, the wire *d*2, the upper winding or the primary winding of the transformer TR, the rectifier *e*4, the lower winding of the relay K7, the contacts 22 and 11, the resistance *r*1, to a negative voltage. The bistable circuit V is held in the 0-position by means of the contact 16.

The resistance *r*1 that is common for all the three mentioned circuits is a protection resistor intended to limit the current strength in the circuit (c), if a ground fault should arise in the wire *x*. If there is such a ground fault, the relay K8 cannot operate and operation of the relay RX cannot be carried out. If no ground fault exists, relay K8 will operate. The contact 81 is closed and negative potential is connected to the contact 11. If the wire *x* is faultless, the circuits (b) and (c) balance each other because the windings of the relay K7 counteract each other, so that the relay K7 does not operate. If the wire *x*, due to some fault, is connected to some other *x*-wire the current passing through the lower winding of relay K7 becomes so much greater than the current passing through the upper winding of relay K7 that relay K7 operates. The contact 70 is closed and connects an input signal to the computer P. This input signal is sensed by the computer before the termination of the pulse T3 and is treated according to the programming of the computer for the recording of faults. When the pulse T3 ceases, the relays K2 and K8 will release and also relay K7 if the last mentioned relay has been operated. That relay or that electromagnet RX which has been operated holds its armature in a holding circuit through the contact *k* and the resistance *r*. The operation is recorded without particular control in the data memory of the computer.

When an electromagnetic means which according to the data memory has to be operated is to be released, a test is first carried out to determine that the electromagnet really is operated. The fast operating unit SMR receives output signals from the computer which indicate the address and furthermore that a release is intended. The contacts *a*1–*an* of the address and the contact S1 are closed at the beginning of the pulse T1. The relay K1 and the relays R1–R*n* corresponding to the address operate. The contacts 10–18 are actuated. The relay K4 operates by means of current passing from an auxiliary battery B through the resistance *r*2, the contacts 12 and 21, the winding of K4 and the resistance *r*6. The contact 41 is closed. At the beginning of the pulse T2 the relay A1 receives current. Simultaneously the relay K3 is connected in a circuit passing through contact S2, the contact 17, the resistance *r*3 and the upper winding of relay K3. In this circuit the relay K cannot operate. When the relay A1 operates, the following circuit is completed: from source +, contact 14, the upper winding of relay K3, the rectifier *e*3, contact 15, the primary winding of the transformer TR, wire *d*2, the contact in D2, the contact 101, the wire *x*, the contact *k* and the resistance *r* to a negative voltage —. The windings of the relay K3 interact, and when both windings are current carrying relay K3 will operate. The contact 31 is closed. Thus, it is indicated that the relay RX that is to be released is in the operated state. If the contact *k* were not closed, the relay K3 would not operate and the contact 31 would not become closed. The relay K6 receives current through the contact 31 and operates. The contacts 60–61 are operated. At the beginning of the pulse T3 the relay K2 operates in the following circuit: source +, the contacts S3, 61 and 52, the winding of relay K2, the wire *v*1 to a negative voltage in the bistable circuit V. The contacts 21–23 are actuated.

The bistable circuit V is held in the 0-position by the contact 41 and the relay K4 is somewhat slow on releasing owing to a capacitor C parallelly connected to the winding of relay K4, and owing to a resistance *r*4.

During the release time of the relay K4 the bistable circuit V cannot be switched. This time is however very short and the only purpose of relay K4 is to prevent the switching of bistable V because of the contact vibration or other oscillations at the beginning of the releasing process. When relay K4 has released and thus the contact 41 as well as the contact 16 are opened the bistable circuit V can be switched.

The following circuit is completed: from source +, the auxiliary battery B, the resistance *r*2, the contacts 12 and 22, the lower winding of K7, the contact 15, the primary winding of the transformer TR, the wire *d*2, contacts in D2, the contact 101, the wire *x*, the winding of relay RX to positive. The current direction in relay RX is reversed and relay RX releases quickly. When the armature of relay RX releases, there arises a rapid decrease of the magnetic field in relay RX simultaneously as the current passing through the resistance *r* is interrupted by the contact *k* which implies an at least temporary decrease of the current passing through the primary winding of the transformer TR. This causes an induced voltage in the secondary winding of TR of such a magnitude and direction that the bistable circuit V which now can be switched changes from the 0-position to 1-position. The negative voltage on the output *v*1 is transmitted to the output *vo*. The relay K5 operates in the following circuit: from source +, contact S3, the contact 61, the winding of relay K5, the output *vo* to a negative voltage. The contacts 50–52 are actuated. The relay K2 is released, when the contact 52 is actuated. In order to prevent contact arcing the winding of the relay K2 is parallelly connected to a rectifier *e*5. The release of relay RX is now completed and the relays K1, K6 and K5 are to be in the operated condition in case no fault has been found. The lower winding of the relay K7 is included in the circuit for the releasing of relay RX but the relay K7 has no function in this case.

During the remaining part of the pulses T1–T3 input signals from the contacts 10, 60, 70, 80 and 50 are monitored. These input signals are marked in the testmatrix XT and are supplied through the cable of wires *p*1 to the computer P. During the control, the contact 80, but not contact 70, is upon operation of relay RX to be closed and upon release of relay RX the contacts 10, 60 and 50 are to be closed. The input signals are treated according to the programming of the computer.

In order to increase the operational reliability of the relay operating unit RMR rectifiers *e*2 and *e*6 and the contact 51 have been introduced. By means of the rectifier *e*2 the relay K6 is held after operation in a circuit through the contacts S3 and 61. By means of the contact 51 the relay K5 is held after operation and by means of the rectifier *e*6 arcing will be prevented.

If the memories of the computer are to be corrected so as to correspond to the real conditions in the selecting device XV the computer goes through the addresses that are to be tested during marking of release signal combined with a signal that inhibits pulses from the contact S3 in the fast operating unit SMR. The relay K1 operates at each test and the relay K3 senses if the relay RX corresponding to the address is operated or is released. If relay K3 operates, also relay K6 will operate. After each test the computer senses in the matrix XT which of the contacts 10 and 60 are closed. If only the contact 10 is closed, the released position will be recorded in the data memory. If both contacts 10 and 60 are closed, the operated position will be recorded in the data memory. As the contact S3 is not closed, no signals which alter the position within the selecting device XV, will be emitted during the test.

We claim:

1. In an automatic telephone exchange the combination comprising a selecting means including electromagnetic devices and a number of lines for incoming and outgoing calls connected to said selecting means, a processor for transmitting and receiving signals, at least one buffer storage unit connected to said processor for receiving signals therefrom, means for transmitting signals from said lines to said processor, said buffer storage unit registering signals transmitted from said processor, an electromagnetic device operating unit connected to said buffer storage unit, said electromagnetic operating unit comprising an address selector arranged to connect the electromagnetic devices in said selecting means in order to carry out and supervise both energizing and release of said electromagnetic devices by means of only one signal wire to each electromagnetic device, a first pulse contact means in said buffer storage unit for signalling said selecting means to select for energization or release a particular electromagnetic device and other pulse contact means in said buffer storage unit transmitting an operating signal to said signal wire of the selected electromagnetic device, a transformer having a primary and a secondary winding, said primary winding being included in the circuit of said operating signal at least when the electromagnetic device is released, an electronic bistable circuit connected to said secondary winding, said electronic bistable circuit being switched by the decrease of current in the signal wire caused by the inductance of the transformer when the electromagnetic device is released and means response to the switching of said electronic bistable circuit to record that the electromagnetic device has released.

2. In an automatic telephone exchange according to claim 1 wherein each of said electromagnetic devices includes a contact means actuated when the electromagnetic device is energized and a holding circuit for the electromagnetic device which is closed by said contact means, and further comprising a control means in said electromagnetic device operating unit for testing before the release of an electromagnetic device that said holding circuit is closed.

References Cited

UNITED STATES PATENTS 3,113,184 12/1963 Hersey -------------- 179—18

KATHLEEN H. CLAFFY, Primary Examiner

T. W. BROWN, Assistant Examiner